United States Patent
Fiore

(10) Patent No.: US 8,091,066 B2
(45) Date of Patent: Jan. 3, 2012

(54) AUTOMATED MULTI-PLATFORM BUILD AND TEST ENVIRONMENT FOR SOFTWARE APPLICATION DEVELOPMENT

(75) Inventor: Paul R. Fiore, Marlborough, MA (US)

(73) Assignee: International Business Machines Corporation, Armonk, NY (US)

( * ) Notice: Subject to any disclaimer, the term of this patent is extended or adjusted under 35 U.S.C. 154(b) by 2048 days.

(21) Appl. No.: 10/926,220

(22) Filed: Aug. 25, 2004

(65) Prior Publication Data

US 2006/0080638 A1    Apr. 13, 2006

(51) Int. Cl.
G06F 9/44 (2006.01)
(52) U.S. Cl. ........ 717/106; 717/107; 717/108; 717/109; 717/110; 717/114
(58) Field of Classification Search .................. 717/106, 717/107, 108, 109, 110, 114, 120, 105
See application file for complete search history.

(56) References Cited

U.S. PATENT DOCUMENTS

| | | | |
|---|---|---|---|
| 5,600,789 A * | 2/1997 | Parker et al. .................... 714/38 |
| 5,623,696 A * | 4/1997 | Johnson et al. ................ 719/326 |
| 5,678,044 A * | 10/1997 | Pastilha et al. ................. 717/110 |
| 5,687,376 A | 11/1997 | Celi, Jr. et al. | |
| 5,701,471 A | 12/1997 | Subramanyam | |
| 5,781,720 A | 7/1998 | Parker et al. | |
| 5,925,101 A * | 7/1999 | Bayless et al. ................ 709/219 |
| 6,002,868 A * | 12/1999 | Jenkins et al. ................ 717/105 |
| 6,098,067 A * | 8/2000 | Erickson ........................ 707/10 |
| 6,275,868 B1 * | 8/2001 | Fraley et al. ................... 719/320 |
| 6,424,974 B1 | 7/2002 | Cotner et al. | |
| 6,457,176 B1 * | 9/2002 | King ............................. 717/173 |
| 6,526,570 B1 * | 2/2003 | Click et al. .................... 717/146 |
| 7,103,562 B2 * | 9/2006 | Kosiba et al. .................. 705/10 |
| 7,107,279 B2 * | 9/2006 | Pociu ............................ 707/102 |
| 7,133,874 B2 * | 11/2006 | Hill et al. ...................... 717/120 |
| 2003/0115572 A1 | 6/2003 | Zondervan et al. | |
| 2003/0195861 A1 | 10/2003 | McClure et al. | |
| 2004/0225994 A1 * | 11/2004 | Wason et al. ................. 717/100 |
| 2006/0059458 A1 * | 3/2006 | Plummer ...................... 717/114 |

FOREIGN PATENT DOCUMENTS

WO     WO94/11818    5/1994

OTHER PUBLICATIONS

Cusumano, et al. "What Netscape learned from cross-platform software development", 1999, Communications of the ACM, p. 72-78.*

(Continued)

*Primary Examiner* — Wei Zhen
*Assistant Examiner* — Qamrun Nahar
(74) *Attorney, Agent, or Firm* — Raymond Szeto; Hoffman Warnick LLC

(57) ABSTRACT

A system, method and program product for implementing an automated multi-platform build and run operation for a software application. A system is provided that comprises: a control process loadable on a host platform, wherein the control process causes the software application to be built and run on both the host platform and a set of remote platforms; and a results manager that captures build and run results from the host platform and the set of remote platforms, and stores the build and run results in a centralized database.

19 Claims, 2 Drawing Sheets

OTHER PUBLICATIONS

Ishizaki, et al. "Effectiveness of Cross-Platform Optimizations for a Java Just-In-Time Compiler", 2003, ACM, p. 187-204.*

IBM Corporation, "Eclipse Platform Technical Overview," Object Technology International, Inc., Feb. 2003, pp. 1-20.

Michael Janulaitis, "Creating HTML User Interfaces for Server Programs," Dr. Dobb's Journal, Jun. 2001, pp. 1-9.

Nimmagadda, S. et al., "Performance Patterns: Automated Scenario-Based ORB Performance Evaluation," 5th USENIX Conference on Object-Oriented Technologies and Systems, SanDiego, California, May 1999, pp. 1-14.

Goes et al., "Performance Analysis of Parallel Programs using Prober as a Single Aid Tool," Proceedings of the 14th Symposium on Computer Architecture and High Performance Computing, 2002, pp. 1-8.

* cited by examiner

AUTOMATED MULTI-PLATFORM BUILD AND TEST ENVIRONMENT FOR SOFTWARE APPLICATION DEVELOPMENT

BACKGROUND OF THE INVENTION

1. Field of the Invention

The present invention relates generally to building and testing software applications, and more specifically relates to an automated system and method for building and testing program code across multiple operating systems and architectures.

2. Related Art

Given the many different types and versions of computer systems, software development environments often require that their software applications work on different operating systems and architectures (i.e., platforms). For instance, a given application may be required to be run on WINDOWS™, OS400™, AIX™, LINUX™, etc. In order to achieve this, software code is typically written in a high level machine independent programming language, e.g., C, C++, etc. Once written, an executable program can then built (e.g., compiled) from the code on each of the target platforms. Once built, the software can be executed and tested on each of the target platforms. Given the complexity of many software applications, the application, or portions thereof, may need to be rebuilt and retested over and over again as source code changes are made.

Unfortunately, these types of development environments are faced with a number of challenges. One problem is that individual developers must have a certain amount of expertise for all of the given platforms in order to properly build and test the application, or portions thereof, on each platform. Because many developers do not have such expertise, they often only build and test the code on only a single platform. When this approach is taken, build or runtime errors on other platforms may not be discovered until a later time when source code changes are merged with source code changes from other developers. Determining the source of the errors at a later time may be a more difficult and costly process, given the fact that there may be no way of knowing which source code change or developer was responsible for introducing the error.

Another challenge is the fact that manually building and testing the application for ongoing source code changes across multiple platforms is both a time and resource intensive process. Moreover, such manual operations are error prone and/or may lack a consistent approach. Accordingly, a need exists for an automated environment that can build and test software applications across multiple platforms without significant involvement from the code developers.

SUMMARY OF THE INVENTION

The present invention addresses the above-mentioned problems, as well as others, by providing an automated multi-platform build and test environment. In a first aspect, the invention provides a system for implementing an automated multi-platform build and run operation for a software application, comprising: a control process loadable on a host platform, wherein the control process causes the software application to be built and run on both the host platform and a set of remote platforms; and a results manager that captures build and run results from the host platform and the set of remote platforms, and stores the build and run results in a centralized database.

In a second aspect, the invention provides a program product stored on a recordable medium for implementing an automated multi-platform build and run operation for a software application, comprising: control means for causing the software application to be built and run on both a host platform and a set of remote platforms; and means for capturing build and run results from the host platform and the set of remote platforms, and for storing the build and run results in a centralized database.

In a third aspect, the invention provides a method for implementing an automated multi-platform build and run operation for a software application, comprising: providing a host platform and a set of remote platforms; running an update script on the host and remote platforms; running a build and execute script on the host platform, wherein the build and execute script initiates a build process that generates the software application on both the host platform and set of remote platforms; generating and capturing build results to a centralized database; executing the software application on the host platform and set of remote platforms; and generating and capturing execution results to the centralized database.

In a fourth aspect, the invention provides a system for deploying an application for implementing an automated multi-platform build and run operation for a software application, comprising: a computer infrastructure being operable to: cause the software application to be built and run on a set of remote platforms; capture build and run results from the set of remote platforms; and store the build and run results in a centralized database.

In a fifth aspect, the invention provides a computer software embodied in a propagated signal for implementing an automated multi-platform build and run operation for a software application, the computer software comprising instructions to cause a computer to perform the following functions: run a build and execute script on the host platform, wherein the build and execute script initiates a build process that generates the software application on both a host platform and a set of remote platforms; generate and capture build results to a centralized database; execute the software application on the host platform and the set of remote platforms; and generate and capture execution results to the centralized database.

BRIEF DESCRIPTION OF THE DRAWINGS

These and other features of this invention will be more readily understood from the following detailed description of the various aspects of the invention taken in conjunction with the accompanying drawings in which.

Figure 1:
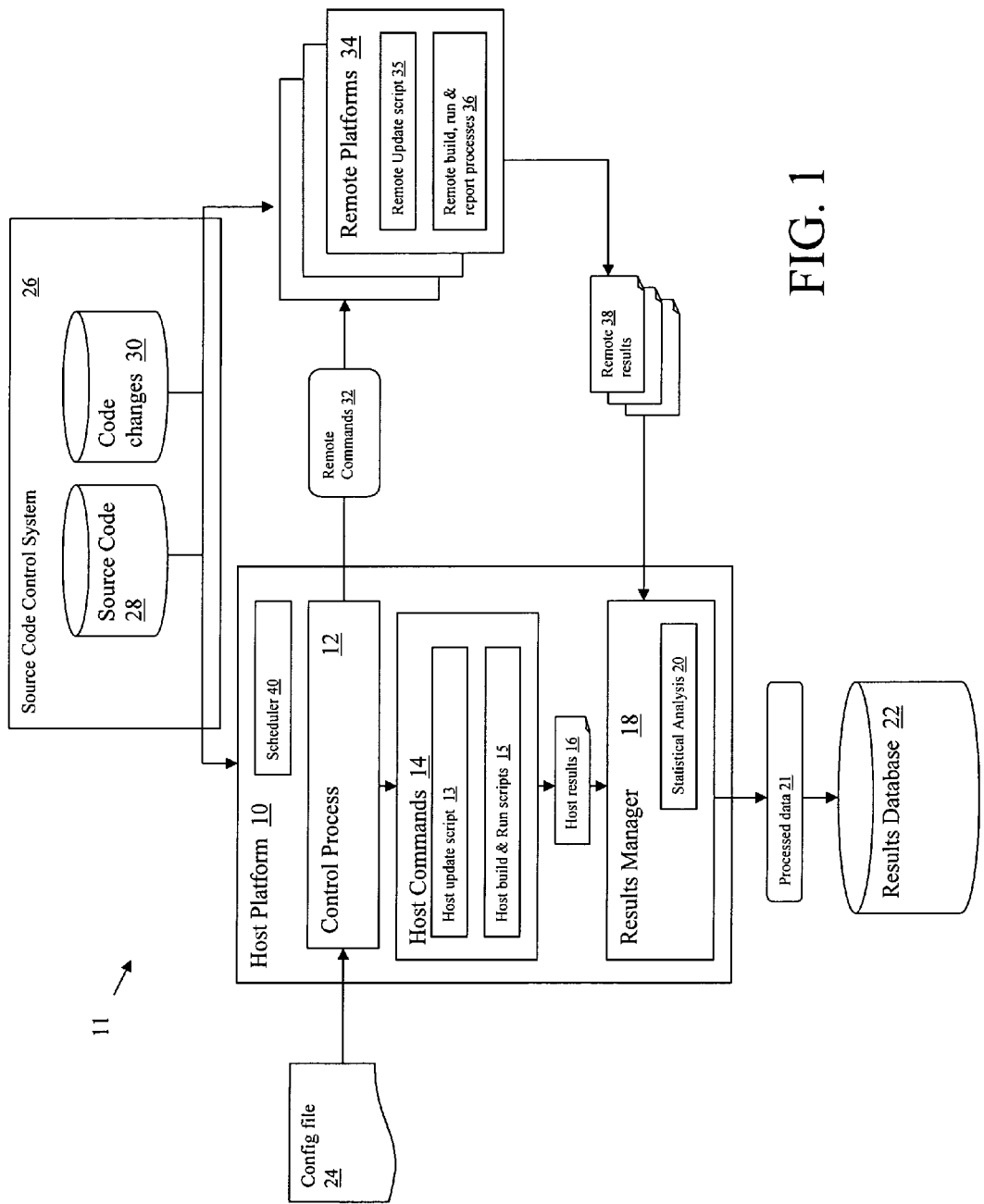
FIG. 1 depicts a system for providing an automated multi-platform build, run and test operation in accordance with the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

Referring now to the drawings, FIG. 1 depicts a system 11 for providing an automated multi-platform build, run and test development environment. In particular, system 11 includes a host platform 10 and one or more remote platforms 34 across which an application can be automatically built, run and tested (referred to herein as a "multi-platform build and run operation"). For the purposes of this disclosure, the term application may comprise a complete application or a portion of a complete application. Results of all build and run processes are collected and stored in a centralized results database 22. Thus, the build and run operations for each platform are triggered from a central location, i.e., the host platform 10, and the build and run results are collected at a central location, i.e., results database 22. It should be understood that any type of testing can be done as part of the run (i.e., execution) process. Thus, the terms run and test are used interchangeably to describe the process of executing the application in a test environment.

In this illustrative example, a source code control system 26 is provided that manages the source code 28, and any code changes 30 created by developers. Source code control systems, such as CLEARCASE™, are well known in the art, and provide mechanisms by which code changes 30 or branches can be identified to replace existing code segments or branches. In particular, different versions of files that make up the entire source code can be selectively built. Thus, source code control system 26 allows code changes 30 to be easily incorporated, tested and managed in an automated fashion.

As noted, control over the system 11 is provided through host platform 10. In a typical example, host platform 10 may comprise a WINDOWS XP™ operating system running on a 32 bit PENTIUM™ processor. However, it should be understood that host platform 10 may comprise any computing environment, e.g., UNIX, LINUX, AIX, etc. Host platform 10 includes a control process 12, which may comprise one or more scripts, that trigger the building and running of the software application on both the host platform 10 and remote platforms 34. Control process 12 may for instance comprise PERL scripts that issue a set of host commands 14 and a set of remote commands 32. Configuration file 24 specifies a list of code changes 30 or branches that should be included by the source code control system 26 in the next multi-platform build and run operation.

On the host platform 10, the host commands 14 first cause a host update script 13 to be run. The host update script 13 performs all the tasks necessary to ensure that host platform 10 is in the correct state to perform the necessary build and run processes. Tasks may include checking parameters and dates, loading any required files, deleting old files, etc. Specific tasks performed by the host update script are described in further detail below with reference to FIG. 2.

Once the host update script 13 is complete, the host build and run scripts 15 are run, which cause the source code 28 and specified code changes 30 to be loaded onto the host platform 10 and built into an executable software application (e.g., with a compiler running on the host platform). The host build and scripts 15 will then cause software application to run against a set of test suites. As the application is being built and run, a set of host results 16 are collected, which detail both the building and testing processes (e.g., error logs, execution output, etc.). The host results 16 are captured by a results manager 18 that may further process, e.g., filter, summarize, analyze, condense, etc., the results data. The processed results 21 are then stored into the results database 22.

As part of the multi-platform build and run operation, control process 12 will generate a set of remote commands 32 that will direct each of the remote platforms 34 to run a remote update script 35 and remote build and run scripts 36 in a similar manner to that which was run on the host platform 10. Namely, each remote platform 34 will first perform an update process to ensure that the remote host is in the correct state. Then, as part of the build and run process, each remote platform 34 will load the source code 28 and any specified code changes 30, build an executable application, and run the application against a test suite. Remote platforms 34 may likewise comprise any operating system and/or architecture, e.g., WINDOWS™, OS400™, AIX™, LINUX™, etc. Results from the build and run operations will be reported/outputted as a set of remote results 38, which will later be captured by the results manager 18 back on the host platform 10. Each of these update, build, run, and report processes are generally controlled by a set of remote scripts that were either: (1) downloaded as part of the remote commands 32 generated by the control process 12; or (2) preloaded on the remote platforms 34. For instance, the build commands may be received as part of the remote commands 32, and the run commands may stored in a script on each of the remote platforms that are triggered by the remote commands 32. Moreover, in some instances, the build and run operations for a particular remote platform 34 may actually be performed on two different machines (i.e., one for building and one for running) with the control process 12 moving executable files from the build systems to the run systems as needed.

As noted, remote results 38 from each of the remote platforms 34 are imported by the results manager 18. In one illustrative embodiment, results manager 18 combines the host results 16 with the remote results 38 into a comprehensive and uniform set of processed data 21. For example, processed data 21 may be stored in an XML format that can be readily adaptable for many uses, such as display on a web page, input into a LOTUS NOTES™ database, etc. In addition, results manager 18 may include a statistical analysis tool 20 that can examine the results data and generate additional analysis information.

Host platform 10 may include a scheduler 40 to cause the multi-platform build and run operation to be initiated on a regular basis, e.g., each night. Alternatively, the multi-platform build and run operation could be initiated manually by an end user. Moreover, it should be understood that the order in which processing takes place among the various platforms can change without departing from the scope of the invention.

It should be appreciated that multi-platform build and test operation of the present invention could be carried out over a network such as the Internet, a local area network (LAN), a wide area network (WAN), a virtual private network (VPN), etc. Moreover, a direct hardwired connection (e.g., serial port), or an addressable connection with host system 10 could be implemented. The addressable connection may utilize any combination of wireline and/or wireless transmission methods. Moreover, conventional network connectivity, such as Token Ring, Ethernet, WiFi or other conventional communications standards could be used. Still yet, connectivity could be provided by conventional IP-based protocol.

In general, each of the host platform 10 and remote platforms 34 may comprise any type of computer system or device capable of carrying out the functions of the present invention. Each such computer system will generally comprise a processing unit, memory, bus, input/output (I/O) interfaces, external devices/resources and storage unit. The processing unit may comprise a single processing unit, or be distributed across one or more processing units in one or more locations, e.g., on a client and server. Memory may comprise any known type of data storage including magnetic media, optical media, random access memory (RAM), read-only memory (ROM), a data cache, etc. Moreover, similar to processing unit, memory may reside at a single physical location, comprising one or more types of data storage, or be distributed across a plurality of physical systems in various forms.

I/O interfaces may comprise any system for exchanging information to/from an external source. External devices/resources may comprise any known type of external device, including speakers, a CRT, LED screen, hand-held device, keyboard, mouse, voice recognition system, speech output system, printer, monitor/display, facsimile, pager, etc. Busses provide a communication link between each of the components in the computer system and likewise may comprise any known type of transmission link, including electrical, optical, wireless, etc.

The storage unit can be any system (e.g., a database) capable of providing storage for information under the present invention. Such information could include, among other things, remote results 38, host results 16 and results database 22. As such, a storage unit could include one or more storage devices, such as a magnetic disk drive or an optical disk drive. In another embodiment, a storage unit may include data distributed across, for example, a local area network (LAN), wide area network (WAN) or a storage area network (SAN) (not shown). Additional components, such as cache memory, communication systems, system software, etc., may be incorporated.

Figure 2:
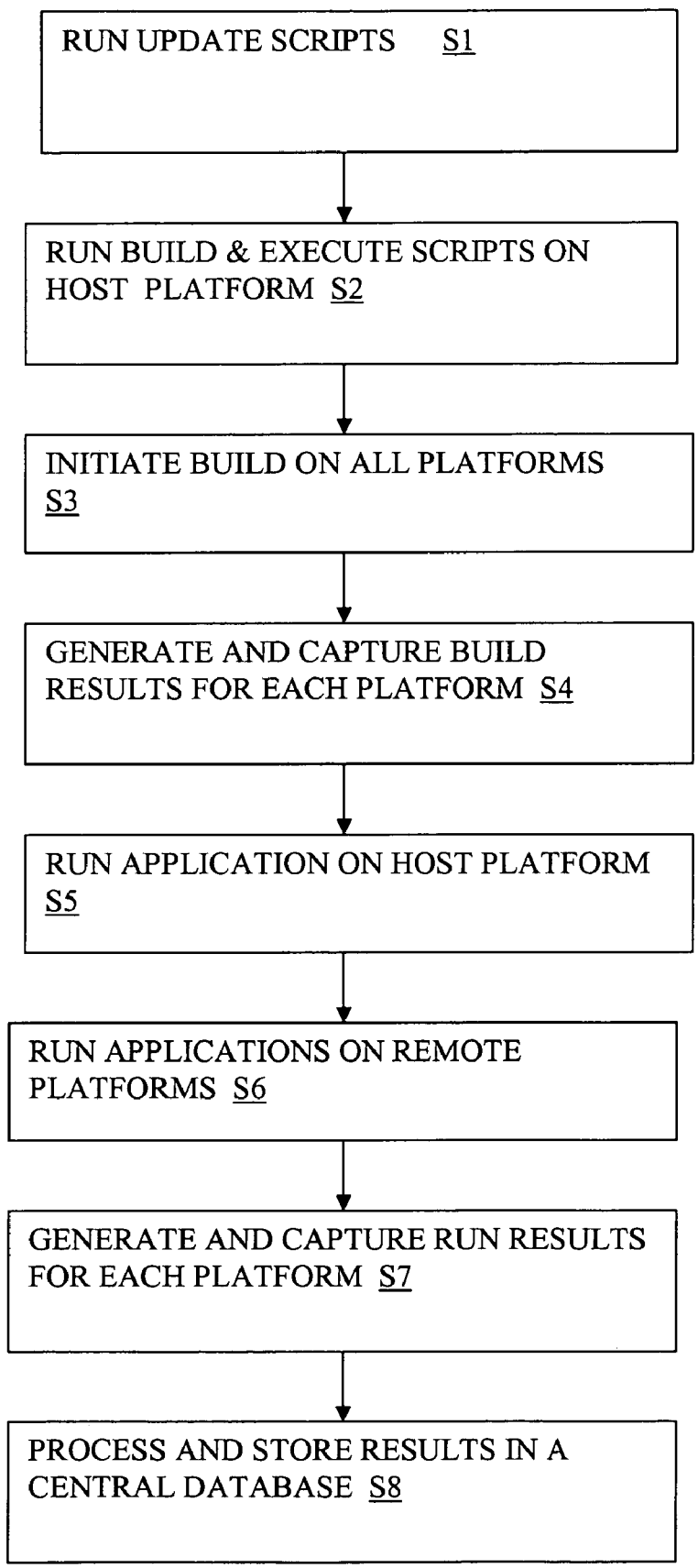
FIG. 2 depicts a flow diagram of a method of implementing an automated multi-platform build and run operation.

Referring now to FIG. 2, a flow diagram describing an illustrative method of implementing a multi-platform build and run operation is shown. In the exampled described below, the operation is implemented using a LOTUS NOTES™ environment. However, it should be understood that the invention can be implemented in any environment. First, at step S1, update scripts 13, 35 are run as part of control process 12. The update scripts will run on and update all the platforms that are part of the operation. Thus, each of the host 10 and remote platforms 34 will include an update script that gets kicked off by the control process 12. Update tasks may include: (1) checking all command line parameters, e.g., to ensure the correct date is being used; (2) checking for build availability; (3) updating each platform with any necessary initialization files and software; and/or (4) installing a uniform server on each remote platform (e.g., a DOMINO™ Server); etc.

Next, at step S2, control process 12 runs build and execute scripts 15 on the host platform 10. Tasks performed by the scripts may include: (1) marking a start time for the script; (2) printing notices; (3) checking command line parameters; (4) terminating any processes (e.g., LOTUS NOTES™ processes); (5) generating configuration specification based on inputted configuration file 24; (6) cleaning previous build directories; and (7) updating which source files are to be built.

Next at step S3, a build is initiated on each platform by a remote script. In a typical embodiment, this step is implemented with a compiler on each platform that compiles the source code. At step S4, build results for each platform are generated and captured. In an illustrative embodiment, XML files are generated based on build errors and warning logs. At S5, a first version of the built application is run and tested on the host platform and at S6, remote versions of the built application are run and tested on the remote platforms 34. In order to effectuate execution on the remote platforms 34, a series of utilities such as "cron" tasks and shell scripts on UNIX platforms may be utilized. Next, at step S7, run results are generated and captured from each platform. As results are generated, results manager 18 may utilize a watcher script that is continuously run to find generated log files (i.e., results) and post those files to the results database 22. Tasks performed by the watcher script may include: (1) parsing the input configuration file for setup variables and system information; and (2) continuously cycling (e.g., every 30 minutes) through all known platforms to find log files based on the configuration file 24. In addition, as shown in step S8, the results are processed and stored in a centralized results database 22. Namely, the watcher script copies log files to the results database 22 and may convert the log files into a summarized text version or XML version that, e.g., can be displayed on a web page or imported into a LOTUS NOTES™ database.

It should be appreciated that the teachings of the present invention could be offered as a business method on a subscription or fee basis. For example, host platform 10 could be created, maintained, supported and/or deployed by a service provider that offers the functions described herein for customers.

It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A system for implementing an automated multi-platform build and run operation for a software application, comprising:
   a computer device comprising:
      a control process loadable on a host platform, wherein the control process causes the software application to be independently compiled from source code on both the host platform and a set of remote platforms and independently run on both the host platform and the set of remote platforms; and
      a results manager that captures build and run results from the host platform and the set of remote platforms, and stores the build and run results in a centralized database.

2. The system of claim 1, wherein the control process comprises a script that directs the host platform to load source code and perform a build and run operation, and transmits a set of remote commands to each of the remote platforms to load the source code and build the software application.

3. The system of claim 1, further comprising a source code control system that manages source code and source code changes utilized to build the software application.

4. The system of claim 3, wherein the control process reads in a configuration file that determines what software code versions are to be included in a build process at each remote platform.

5. The system of claim 1, wherein the results manager includes a statistical analysis tool that analyzes and then converts build and run results captured from the host platform and remote platforms into XML data.

6. The system of claim 1, wherein the results manager filters the build and run results captured from the host platform and remote platforms.

7. The system of claim 1, wherein the control process includes an update script that runs on each of the host platform and remote platforms to prepare each platform for building the software application.

8. The system of claim 1, wherein both the host and remote platforms include a test suite for testing the software application as it is run and generating results.

9. A program product stored on a recordable medium for implementing an automated multi-platform build and run operation for a software application, comprising:
   control means for causing the software application to be independently compiled from source code on both a host platform and a set of remote platforms and independently run on both the host platform and the set of remote platforms; and
   means for capturing build and run results from the host platform and the set of remote platforms, and for storing the build and run results in a centralized database.

10. The program product of claim 9, wherein the control means comprises a script that directs the host platform to load source code and perform a build and run operation, and transmits a set of remote commands to each of the remote platforms to load the source code and build the software application.

11. The program product of claim 9, further comprising a source code control system that manages source code and source code changes utilized to build the software application.

12. The program product of claim 11, wherein the control means reads in a configuration file that determines what software code versions are to be included in a build process at each remote platform.

13. The program product of claim 9, wherein the means for capturing analyzes and converts build and run results from the host platform and remote platforms into XML data.

14. The program product of claim 9, wherein the means for capturing filters the build and run results captured from the host platform and remote platforms.

15. The program product of claim 9, wherein the control means includes an update script that that causes each of the host platform and remote platforms to prepare for building the software application.

16. A computer-implemented method for implementing an automated multi-platform build and run operation for a software application, comprising:
   providing a host platform comprised of a computer device and a set of remote platforms;
   running an update script on the host and remote platforms;
   running a build and execute script on the host platform, wherein the build and execute script initiates a build process that independently compiles source code on both the host platform and set of remote platforms and independently generates the software application on both the host platform and set of remote platforms;
   generating and capturing build results to a centralized database;
   executing the software application on the host platform and set of remote platforms; and
   generating and capturing execution results to the centralized database.

17. The computer-implemented method of claim 16, comprising the further steps of:
   providing a source code control system;
   reading in a configuration file that identifies source code changes that are to be included by the build process on both the host platform and set of remote platforms; and
   analyzing the execution results.

18. The computer-implemented method of claim 16, wherein the update script prepares each of the platforms for the build process.

19. The computer-implemented method of claim 16, wherein the build and execute results are converted into XML data.

* * * * *